United States Patent [19]

Caruso et al.

[11] 3,937,055

[45] Feb. 10, 1976

[54] METHOD OF PEENING AND PORTABLE PEENING GUN

[75] Inventors: Vincent P. Caruso, Huntsville; Elbert J. Minter, Decatur, both of Ala.

[73] Assignee: The United States of America as represented by the United States National Aeronautics and Space Administration, Washington, D.C.

[22] Filed: Nov. 6, 1974

[21] Appl. No.: 521,602

[52] U.S. Cl. .................... 72/399; 29/81 D; 72/453; 173/132
[51] Int. Cl.² ...................... B21D 41/00; B21J 7/16
[58] Field of Search ......... 72/399, 76, 453; 78/13.1; 30/164.8; 173/131, 132, 169; 101/3, 4; 29/81 D, 81 L, 81 R

[56] References Cited
UNITED STATES PATENTS

| | | | |
|---|---|---|---|
| 2,356,314 | 8/1944 | Gray et al. | 29/81 D |
| 2,799,035 | 7/1957 | Pfluger | 15/22 |
| 3,117,475 | 1/1964 | Anders | 72/453 |
| 3,150,888 | 9/1964 | Parker | 29/81 D X |
| 3,343,246 | 9/1967 | Kelley et al. | 29/81 D |
| 3,349,461 | 10/1967 | Niedzwiecki | 29/81 D |
| 3,359,611 | 12/1967 | Kelley | 29/81 D |
| 3,444,714 | 5/1969 | Gustkey | 72/399 X |
| 3,451,490 | 6/1969 | Troike | 29/81 D X |
| 3,571,874 | 3/1971 | Arx | 29/81 D |
| 3,680,643 | 8/1972 | Cameron et al. | 29/81 D X |

*Primary Examiner*—Victor A. DiPalma
*Attorney, Agent, or Firm*—Wayland H. Riggins; L. D. Wofford, Jr.; John R. Manning

[57] ABSTRACT

An improved portable peening gun characterized by a pneumatic motor, an axially reciprocable hammer supported to be driven by the motor from an initial position along a linear path, and an improved peening head including an axially reciprocable rod bundle coaxially aligned with the hammer and disposed within the path thereof. The improved head includes a plurality of peening rods, each being characterized by an anvil defined at one end thereof for receiving the hammer in impacting engagement, and a peening surface defined at the other end of a configuration substantially conforming to a segment of a sphere having a radius substantially equal to one-half the thickness of the rod, a barrel for supporting the rod bundle for axial reciprocation, and a helical spring disposed within the barrel for urging the bundle in displacement toward its initial position.

2 Claims, 6 Drawing Figures

METHOD OF PEENING AND PORTABLE PEENING GUN

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention generally relates to peening hammers and more particularly to a portable peening hammer having an improved peening head through the use of which is achieved effects similar to the effects achieved when employing shot-peening systems.

As is well understood by those familiar with metal working arts, peening is a process through which residual compressive stresses are imparted to the surface of ductile materials by striking the surface with an object having a hemispherical configuration. For example, the process often is performed simply by striking the surface of a selected ductile metal with a hemispherical head of a ball peen hammer.

Of course, other techniques are employed where so desired. Such techniques include the use of systems wherein steel shot is propelled at a high velocity against the surface of the metal being peened. In practice, the velocity is imparted to the shot through the use of streams of pressurized air, centrifugal force, streams of water at high pressures, and, of course, the forces of gravity.

Unfortunately, the equipment and tooling required in order to utilize pneumatic, centrifugal, hydraulic and gravity-propelled shot is dangerous, bulky, expensive, and frequently too difficult to control, particularly when peening small surface areas such as those found on thin forging pads provided for space vehicles. For example, shot peening processes often require the use of stationary systems located in workshops and the like. Hence components to be peened must be transported from a given location to a shop, often remotely located. Moreover, as can readily be appreciated, the high velocity of the shot and the high pressures of the streams of air and water employed in propelling the shot creates a safety hazard, and, of course, the spent shot tends to contaminate the immediate vicinity. Another disadvantage encountered when employing shot-peening systems is attributable to the fact that spent shot tends to establish a protective shield for a surface being peened so that a loss of energy and change of direction is experienced by live shot striking spent shot. Thus the effectiveness of such systems is substantially reduced.

As should, therefore, readily be apparent, there currently exists a need for an improved portable peening gun which can be transported and readily employed in manually performing peening operations for thereby avoiding the difficulties heretofore encountered in employing shot-peening equipment.

It is, therefore, the general purpose of the instant invention to provide an improved portable peening gun capable of being employed for effectively and rigidly peening the surface areas of components mounted in fixed relation with supporting structure, for example, thin forgings mounted on Saturn S-1B vehicles.

OBJECTS AND SUMMARY OF THE INVENTION

It is an object of the instant invention to provide an improved portable peening gun which overcomes the aforementioned difficulties and disadvantages.

It is another object to provide a portable peening gun which can readily be employed in performing manual peening operations.

It is another object to provide an improved method of performing manual peening operations.

It is another object to provide a lightweight, hand-held inexpensive peening gun having an improved peening head for use in manually peening relatively small surfaces.

It is another object to provide a practical, economic, and manually operable, hand-held peening gun having an improved peening head which safely and effectively can be employed in peening small surfaces of ductile material for imparting residual compressive stress thereto, similar in effect to the effects achieved through a use of shot-peening systems.

These and other objects and advantages are achieved through a portable peening gun of a type having an improved peening head which includes an axially reciprocable rod bundle, coaxially aligned with a pneumatically driven hammer, including a plurality of peening rods, each being characterized by an anvil defined at one end thereof for receiving the hammer in impacting engagement and a peening surface defined at the opposite end having a configuration substantially conforming to a segment of a sphere having a radius of curvature substantially equal to one-half the thickness of the peening rod, as will hereinafter become more readily apparent by reference to the following description and claims in light of the accompanying drawings.

DESCRIPTION OF THE PREFERRED EMBODIMENT

Figure 1:
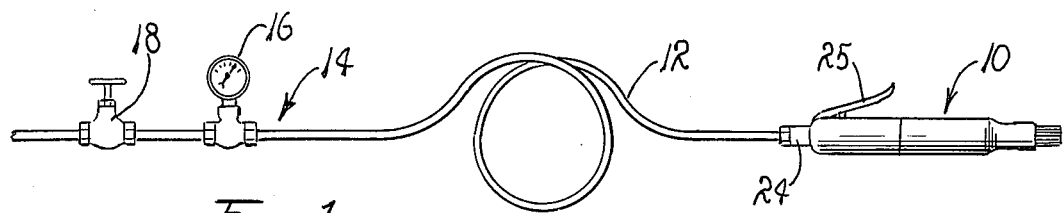
FIG. 1 is a pictorial view of a pneumatic system within which there is connected a portable peening gun embodying the principles of the instant invention.

Referring now to the drawings wherein like reference characters designate like or corresponding parts throughout the several views, there is shown in FIG. 1 a peening gun, generally designated 10, which embodies the principles of the instant invention.

As shown in FIG. 1, the peening gun 10 is connected through a pressure hose 12 with a pneumatic system, generally designated 14. The system 14, as a practical matter, includes a line within which there is connected an air gauge 16 and a pressure regulator 18 through which the pressure of air delivered by the system to the peening gun 10, via the pressure hose 12, can readily be adjusted to a preselected value. Since the system 14 forms no specific part of the instant invention, a more detailed discussion thereof is omitted in the interest of brevity.

Figure 2:
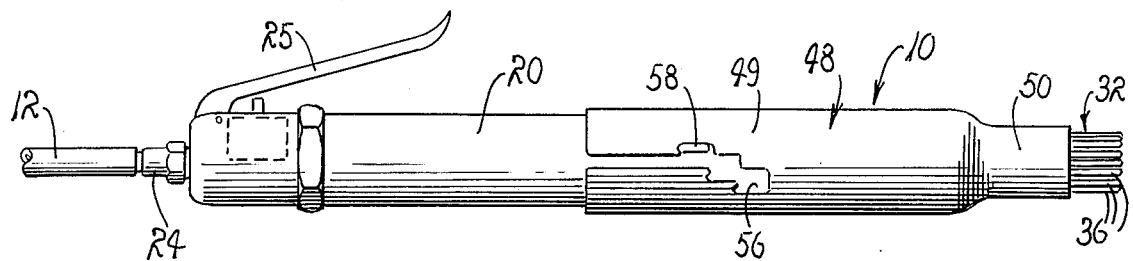
FIG. 2 is a side elevation, on an enlarged scale, of the peening gun shown in FIG. 1.
Figure 3:
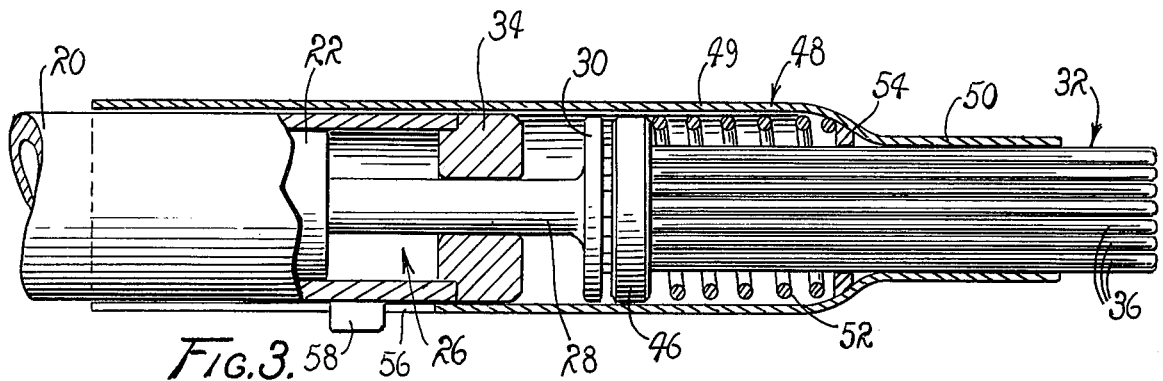
FIG. 3 is a fragmented, cross-sectional view of a peening gun shown in FIG. 2, depicting a pneumatic motor, an axially reciprocable hammer, and a rod bundle supported by a concentrically related barrel and return spring.
Figure 4:
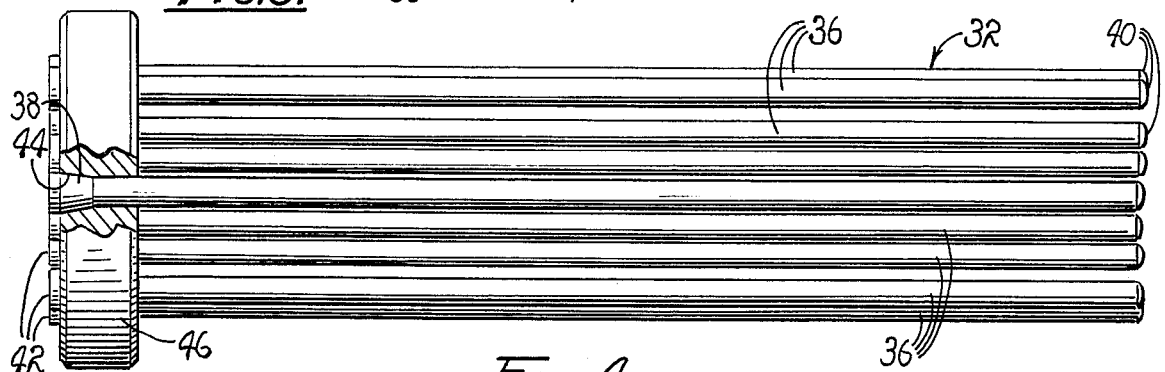
FIG. 4 is a partially sectioned, elevational view, on an enlarged scale, of the rod bundle shown in FIG. 3.
Figure 5:
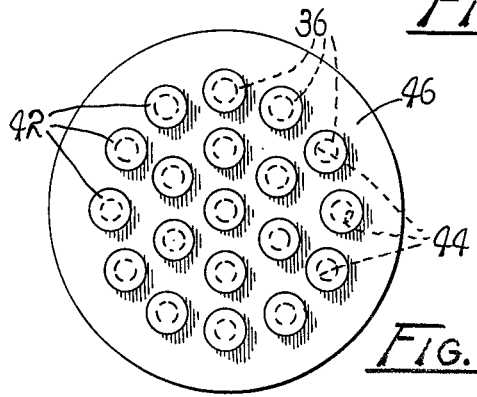
FIG. 5 is an end view of the rod bundle shown in FIGS. 3 and 4.

Referring now to FIG. 2, the peening gun 10 includes a tubular housing 20 within which there is disposed a pneumatic motor 22, FIG. 3. The motor is, of course, connected with the pressure hose 12 through a suitable fitting 24 while the on-off operation is selectively controlled by a trigger arm 25. From the motor 22 there is extended a hammer, generally designated 26, supported for axial reciprocation along a rectilinear path. It is to be understood that the motor 22 is of any suitable design and serves to impart reciprocatory motion to the hammer 26 in response to air under pressure delivered thereto via the pressure hose 12. Since pneumatic motors capable of imparting rectilinear reciprocation to an axially reciprocable hammer are well known, and the motor 22 is, in practice, varied as desired, a more detailed description thereof is omitted, also in the interest of brevity.

The hammer 26 includes an elongated shaft 28 connected with the motor 22 and terminating in a diskshaped head 30 disposed immediately adjacent to a rod bundle, generally designated 32. Preferably, the hammer 26 is supported for axial reciprocation by an annular bearing 34 seated within the housing 20, adjacent to the distal end thereof, through which is extended the shaft 28. Thus rectilinear motion of the hammer is facilitated.

Figure 6:
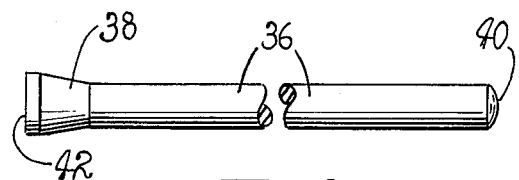
FIG. 6 is a fragmented view of a peening rod included within the rod bundle.

The rod bundle 32 includes a clustered plurality of peening rods 36 disposed in substantial parallelism. As best shown in FIG. 6, each of the peening rods 36 is of a cylindrical configuration and is provided at one end with an anvil 38 while a peening surface 40 is provided at the opposite end of the rod for engaging a surface to be peened.

It is important to note that the peening surface 40, for each of the peening rods 36, is of a hemispheric configuration having a radius equal to one-half the thickness of the peening rod in order to assure that as peening occurs substantially uniformly configured indentations are formed in the surface. Consequently, the effect achieved through the use of the peening rods 36 is substantially the same as the effects achieved when performing shot-peening operations.

The anvil 38 for each of the peening rods 36 includes a tapered portion terminating in spaced relation with a face 42, of a substantially planar configuration, against which the head 30 of the hammer 26 is caused to impact as reciprocatory motion is imparted thereto. It is here noted that the peening rods 36 are supported within a plurality of uniformly spaced openings 44 formed in a disk-shaped retainer 46. It will be appreciated, therefore, that each of the openings 44 of the retainer 46 is suitably tapered to a frusto-conical configuration for receiving the tapered portion of an anvil 38 with the face 42 thereof being projected from the face, not designated, of the retainer 46.

The rod bundle 32 is received in a confined relationship within a concentrically related barrel 48, which is, in turn, received in telescopic relation, by the housing 20. As a practical matter, the barrel 48 includes a base segment 49 having an internal diameter substantially equal to the outside diameter of the housing 20, and a distal segment 50 having an internal diameter substantially equal to the outside diameter of the rod bundle 32. Thus, the peening rods 36 are, in effect, confined within the distal segment 50, of the barrel 48, and guided thereby as axial motion is imparted to the rod bundle, for thus displacing it from an initial position, in response to a simultaneous impacting engagement of the head 30, of the hammer 26, with the faces 42 of the peening rods 36.

In order to assure that the rod bundle 32 is returned to its initial position, a helical spring 52 is provided in concentric relation with the rod bundle 32 and is seated on the retainer 46. Where so desired, a collar 54 is machined or otherwise provided within the barrel 48 for engaging the opposite end of a helical spring 52. Thus the spring 52 acts against the retainer 46 as it is driven toward the distal segment 50 of the barrel 48 in response to an impacting engagement therewith of the head 30 of the hammer 26.

As a practical matter, the reactive forces developed by the helical spring 52, as motion is imparted to the rod bundle 32, are controlled through a selective repositioning of the barrel 48, relative to the housing 20. In practice, an adjusting slot 56, having axially spaced shoulders, not designated, is formed in the barrel 48 and received by a stop 58 mounted on and projected from the housing 20. Consequently, the kinetic energy stored in the spring 52, during a given cycle of operation, can be varied simply by axially repositioning the barrel 48 and locking it in place, relative to the housing 20, by permitting a selected shoulder of the slot 56 to seat against the stop 58.

OPERATION

It is believed that in view of the foregoing description the operation of the device will readily be understood and it will be briefly reviewed at this point.

With the peening gun 10 assembled in the manner hereinbefore described, the rod bundle 32 is readied for operation simply by positioning the peening surfaces 40 of the peening rods 36 into engagement with a selected surface to be peened. Pneumatic pressure is then selectively delivered to the motor 22 simply by depressing the trigger arm 25 for thereby delivering air under pressure to the motor 22. As air under pressure is delivered to the motor 22 a power stroke is imparted to the hammer for causing it to impact against the faces 42 of the peening rods 36 whereupon the rod bundle 32 is driven from its initial position. As the rod bundle 32 is advanced in response to the impacting engagement of the hammer 26 the peening surfaces 40 of the peening rods 36 impact against the surface to be peened. The spring 52 now becomes effective for driving the rod bundle in a return stroke toward the initial position from which it was driven by the motor 22.

As the hammer 26 is caused to reciprocate, in the manner aforedescribed, the head 30 impacts repetitiously against the faces 42 of the peening rods 36 for repeatedly driving the rod bundle 32 in an axial direction toward the surface to be peened. Of course, the pressure of the air delivered to the motor 22, via the pressure hose 12, is varied as desired for controlling the depth of the indentations thus created in the surface. Thus tearing of the surface is avoided. The rate at which the strokes are imparted to the rod bundle 32 is varied simply by repositioning the barrel 48, relative to the housing 20.

In view of the foregoing, it should readily be apparent that the peening gun of the instant invention provides a practical solution to the perplexing problem of economically and safely performing peening operations for peening small surfaces without necessitating a use of large, complex, and bulky shot-peening equipment.

Although the invention has been herein shown and described in what is conceived to be the most practical and preferred embodiment, it is recognized that departures may be made therefrom within the scope of the invention, which is not to be limited to the illustrative details disclosed.

We claim:

1. In a portable peening gun of the type having a hammer supported for axial reciprocation along a rectilinear path and a pneumatic motor for driving the hammer in a first direction along the rectilinear path, the improvement comprising:
   A. an axially reciprocable rod bundle including a plurality of peening rods, each being characterized by an anvil defined at one end thereof for receiving the hammer in impacting engagement as the hammer is driven in said first direction;
   B. means supporting said rod bundle within the path of said hammer including a barrel of a substantially tubular configuration supported in coaxial alignment with the hammer and concentrically related to the rod bundle;
   C. a retainer for confining the plurality of peening rods in closely spaced relation within the bundle, including a retainer of a disk-shaped configuration and characterized by a plurality of uniformly spaced bores extended therethrough for receiving the peening rods;
   D. means for driving said hammer in a second direction, opposite to said first direction, including a helical spring disposed within the barrel in concentric relation with the rod bundle seated against the retainer for continuously urging said bundle in displacement toward said hammer; and
   E. means defining a peening surface of a substantially hemispheric configuration at the end of each of said peening rods, opposite said one end, characterized by a radius substantially equal to one-half the thickness of the rod at the end of which the surface is defined.

2. In a method of peening the surface of a metallic body for inducing therein residual compressive stresses, the step of:
   simultaneously impacting against a selected surface of a metallic body to be peened, a closely spaced plurality of peening surfaces of hemispheric configurations defined at the ends of a plurality of axially reciprocating, closely spaced peening rods for thus forming in said selected surface a plurality of closely spaced indentations of substantially hemispheric configurations, whereby residual compressive stresses are imparted to the surface of said body.

* * * * *